H. P. FISHER.
ELEVATOR.
APPLICATION FILED APR. 23, 1917.

1,240,552.

Patented Sept. 18, 1917.
2 SHEETS—SHEET 1.

Inventor
Harry P. Fisher
By Cheever & Cox
Attys

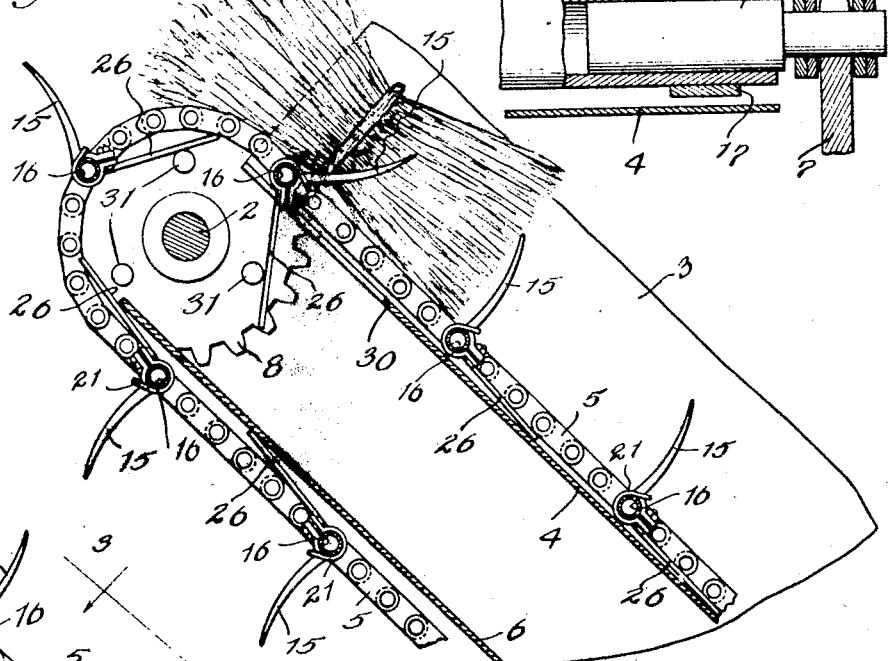
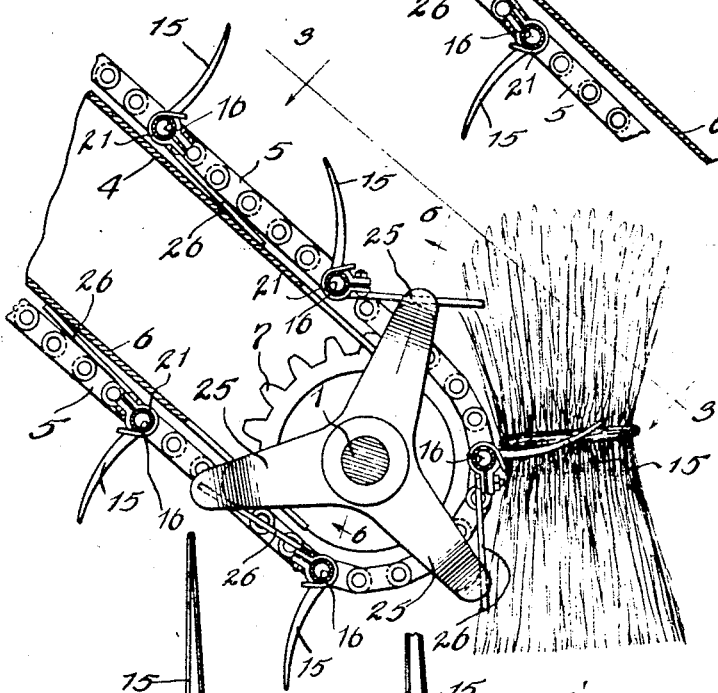
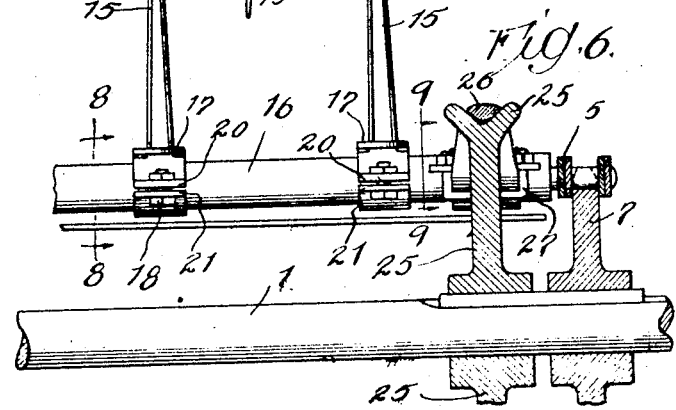
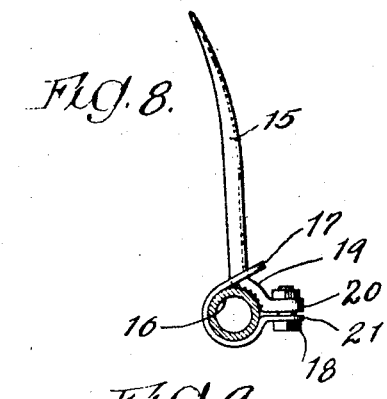

H. P. FISHER.
ELEVATOR.
APPLICATION FILED APR. 23, 1917.
1,240,552.
Patented Sept. 18, 1917.
2 SHEETS—SHEET 2.
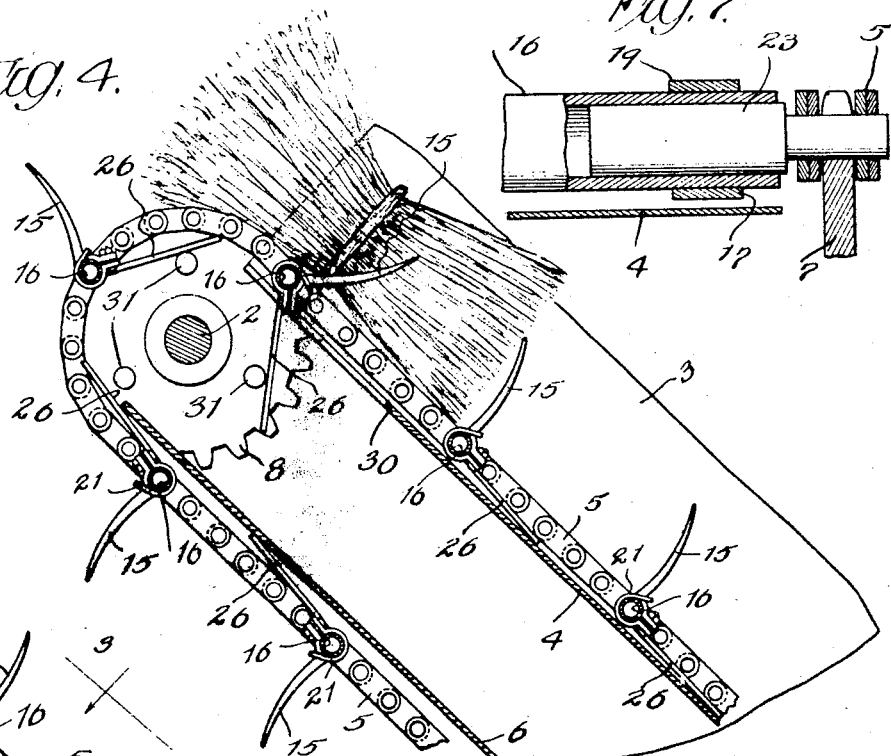
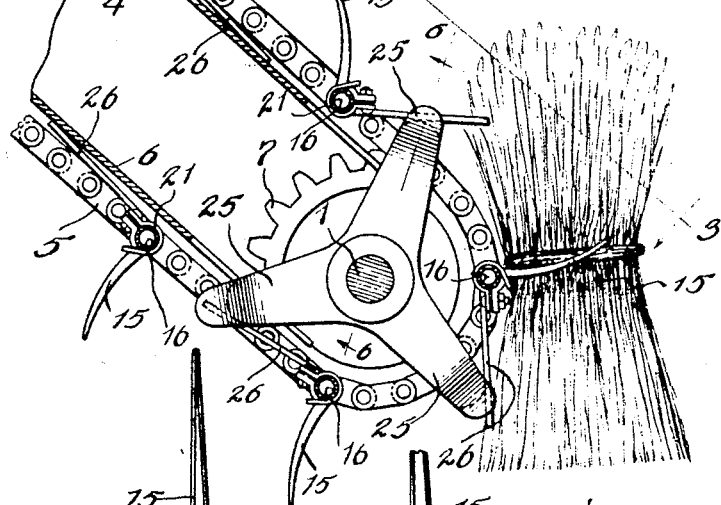
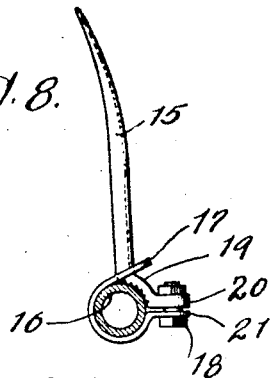
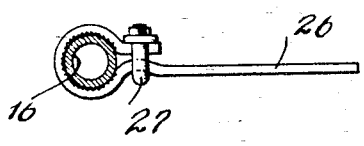
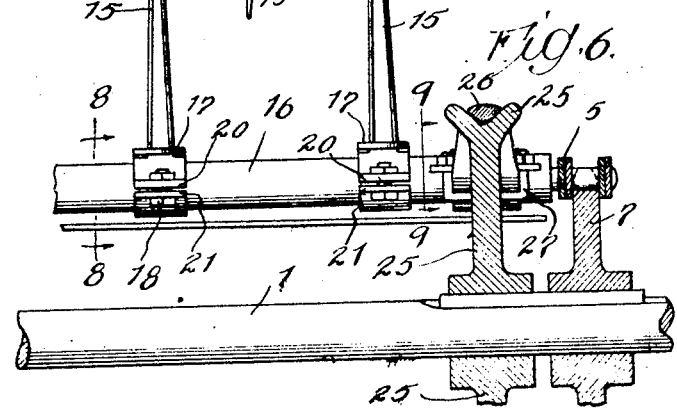
Inventor
Harry P. Fisher
By Cheever & Cox
Attys

UNITED STATES PATENT OFFICE.

HARRY P. FISHER, OF CHICAGO, ILLINOIS.

ELEVATOR.

1,240,552.   Specification of Letters Patent.   Patented Sept. 18, 1917.

Application filed April 23, 1917. Serial No. 163,819.

*To all whom it may concern:*

Be it known that I, HARRY P. FISHER, a citizen of the United States, residing at Chicago, in the county of Cook and State of Illinois, have invented a certain new and useful Improvement in Elevators, of which the following is a specification.

My invention relates to elevators or flight conveyers for raising and delivering various materials and products and is especially useful in connection with farming machinery, where grain, hay or other farm produce is to be raised and delivered to a wagon or other receptacle. Considered in its general aspect, the purpose of the invention is to produce apparatus of this kind which shall be simple and effective in raising the goods from the ground or platform to the wagon or other receptacle. In order to explain the invention in one of its most advantageous forms I have illustrated it embodied as a sheaf loader, adapted to load farm produce, such as sheaves of grain, onto a wagon. Among the specific objects of the invention, it is my aim first, to provide means whereby the prongs while rounding the foot of the conveyer, will assume a particularly advantageous position for engaging the produce and getting it onto the apparatus; second, to provide means whereby the action of the prongs at this point may be regulated, third, to procure certain refinements in details which will become evident as the description proceeds.

I obtain my objects by the mechanism illustrated in the accompanying drawings, in which—

Fig. 4 is a vertical sectional view of the upper end of the elevator.

Fig. 5 is a vertical sectional view of the lower end of the elevator.

Fig. 6 is a sectional view on the line 6—6, Fig. 5.

Fig. 7 is a detail chiefly in axial section showing the manner of supporting the cross bars.

Fig. 8 is a side elevation showing one of the prongs and its support, the view being taken on the line 8—8, Fig. 6.

Fig. 9 is a side elevation of one of the controlling arms, the view being taken on the line 9—9, Fig. 6.

Similar numerals refer to similar parts throughout the several views.

Figure 1:
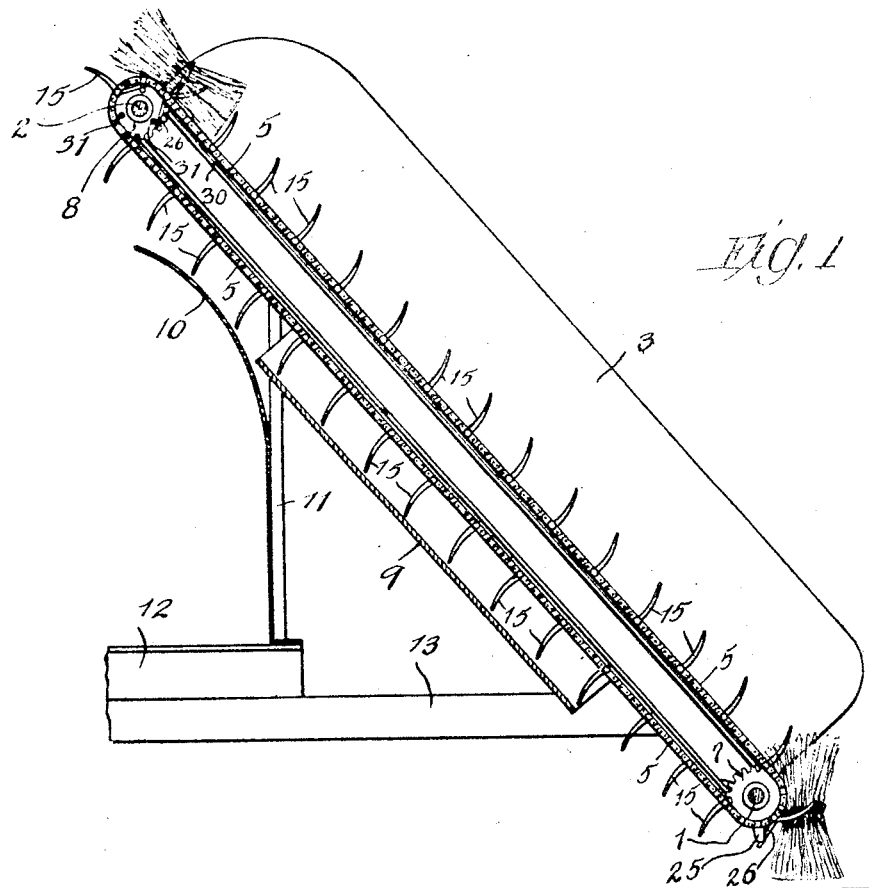
Figure 1 is a side sectional elevation of the assembled apparatus.
Figure 2:
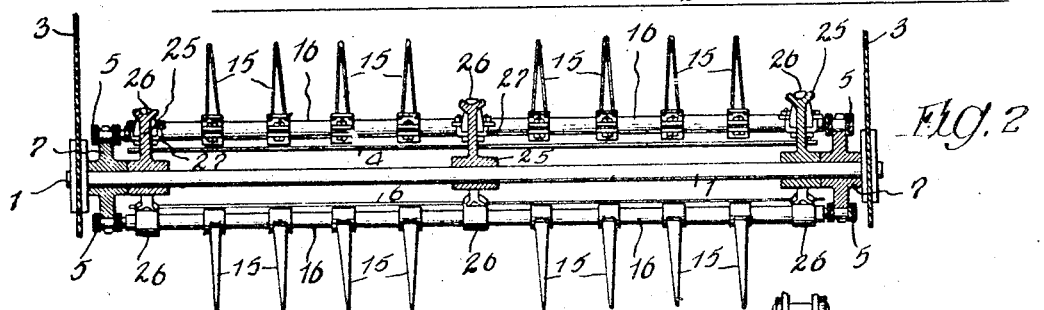
Fig. 2 is a view chiefly in section through the axis of the shaft at the foot of the elevator.
Figure 3:
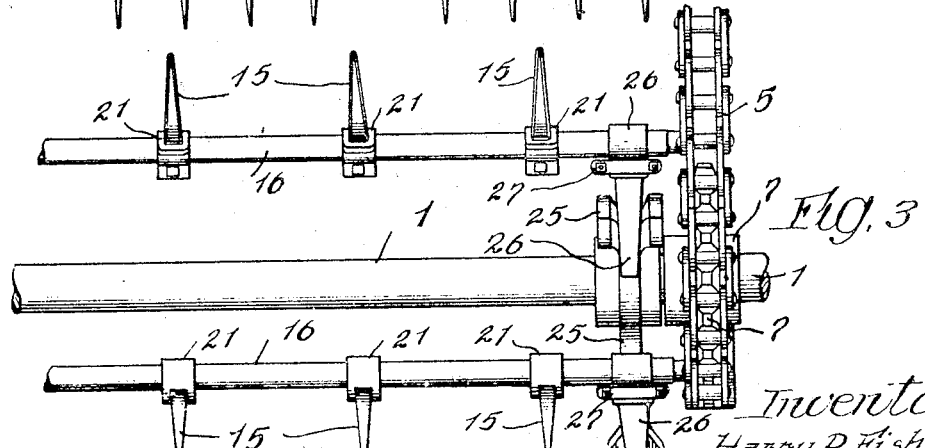
Fig. 3 is a top view of the foot of the elevator on the line 3—3, Fig. 5.

In the form selected to illustrate the invention, there is a shaft 1 at the foot of the conveyer, and a shaft 2 at the top. Said shafts are journaled in a suitable form of chute which is provided with side pieces 3 for keeping the material within the chute. Power in any suitable form is applied to one of said shafts, preferably the upper one. A floor 4 forms part of the chute and is located under the upper run of the link belts or chains 5. A lower floor 6 lies beneath and parallel to the upper floor and overlies the lower run of the belts. Said belts pass over sprockets 7 and 8 in the ordinary manner, the sprocket 7 being secured to the lower shaft and the sprocket 8 to the upper one. It is desirable to place a guard 9 under the prongs of the lower run, and a guard 10 should also be placed at the end of the vehicle for protecting persons or material which may be near the upper end of the conveyer. The conveyer frame is here shown to be supported partly upon posts 11 rising from the floor 12 of the vehicle and partly upon sills 13 which extend rearward from the vehicle.

It will be understood that the form of the elements which actually engage the material to be elevated may be considerably varied, depending upon the nature of the material itself. In the example illustrated in the drawings, the engaging members are especially adapted to engage sheaves of grain, although they may, without change, be applied to other agricultural produce. In the illustrated case, prongs 15 are employed as the engaging elements, and it is desirable that these be somewhat resilient. They are clamped to the cross bars 16 by clips 17 secured by bolts 18, as shown in detail in Fig. 8. As illustrated, the prongs are formed of sheet metal, channeled longitudinally to increase their strength. They have a foot portion 19 which seats upon the cross bar and a lug 20 for receiving bolt 18. The clips 17 are also of sheet metal and are apertured at the upper end to enable them to be slipped over the end of the prong. They are approximately U-shaped in order to surround the cross bar, and terminate in a lug 21 which receives the bolt 18. This construction is simple and yet it affords means whereby any individual prong may be quickly and easily removed and replaced in case of damage.

Cross bars 16, mentioned, are spaced at proper intervals and extend across from one of the link belts to the other. They are supported at their ends by said belts, and while the construction in this respect may be varied, the preferred construction is shown in detail in Fig. 7. The illustrated bars are hollow and provided at their ends with gudgeons 23, the outer ends whereof pass through the belts and take the place of the pivot pins which would otherwise be employed to articulately connect the links together. They pass over the sprockets 7 and 8 and are engaged by the teeth thereof. As a result of this construction, the bars are forced to travel with the belts but are individually rotatable about their longitudinal axes.

I will now describe the mechanism which renders the prongs especially efficient in picking up grain or other material at the foot of the elevator.

The parts are so designed that the prongs in rounding the lower sprockets assume a horizontal position at an early stage, the horizontal position, of course, being the one in which they are most effective to take the material off the ground or out of the shock. It is probably at the time when the material is first picked up that the greatest strain is put upon the prongs and, as a result of my construction, the prongs are firmly held to their work at this stage of the operation. The mechanism in question is well shown in Figs. 5 and 6. A spider 25 is fastened near each end of shaft 1. In the present case each spider has three arms which are bifurcated at the outer end to form seats for the controlling arms 26 which are rigidly fastened to the cross bars 16 for rotating them about their axes. The method of fastening these controlling arms may be varied, but in the form shown in detail in Fig. 9, they are formed of a single piece with an eye at the inner end which encircles the cross bar and is caused to clamp the bar by means of a U-bolt 27. On the upward run, the arms drag along on the upper floor 4 and are supported by it and hence hold the prongs firmly to their load.

In the design shown, the length of the arms of the spider is greater than the diameter of the sprocket 7 and hence as the spider arm swings around beneath the free end of the controlling arm, it throws the latter radially outward which has the effect, when viewed as in Fig. 5, of rotating the attached cross bar in an anti-clockwise direction, which throws the outer end of the attached prongs forward. As the motion continues, the motion is enhanced and consequently the prongs, as they round the foot of the conveyer, have their points accelerated and cocked upward, which enables them to dig into the material and securely engage it and bring it onto the upper rung of the elevator. The action of the spiders and controlling arms is therefore to accelerate the movement of the points of the prongs as they reach the lower end of the elevator and cause them promptly to assume an effective position for engaging and retaining the material to be elevated.

As has been stated, the arms of the spider are three in number and hence are 120 degrees apart. The sprocket wheels 7, however, have many more than three teeth, the present drawings showing them to have at least twenty. By assembling the chain on the sprocket either one tooth ahead or one tooth behind the position illustrated, the cross bars 16 will come farther from or closer to the ends of the spider and hence the angularity of the prongs at any given point of their travel will be varied. In other words, by shifting the chain a link or two forward or a link or two backward, the action of the spider upon the prongs may be regulated.

Now referring to the mechanism at the top of the elevator, whereby a special acceleration is imparted to the material at about the time it is leaving the elevator: The upper floor 4 forms a support for the controlling arms 26 as they travel upward. This holds the prongs to their work and prevents the rotatable cross bars 16 from permitting the prongs to yield under the weight they are carrying. The floor 4 terminates at the point 30, see Fig. 4, which is just below the point where the link belts pass onto the upper sprockets 8. This permits the controlling arms 26 to suddenly drop backward until they are arrested by stop pins 31 projecting from the sides of the upper sprocket wheels. As the sprockets continue to rotate, however, the pins, which for the moment are supporting the controlling arms, move toward the plane of the floor. The result is that the controlling arms are rotated with considerable rapidity in an anti-clockwise direction, Fig. 4, and, as the movement of the parts continues, the connected cross bar begins to move downward away from said plane. This continues the anti-clockwise rotation of the bar, and the amount of rotation exceeds the amount which would occur if it maintained its position relatively to the links which support it. The motion is something akin to a simple harmonic motion, and this has the effect of imparting a special impetus to the material as the latter leaves the top of the conveyer. Consequently, the material instead of simply dropping down from the top of the elevator is thrown forward with considerable force and hence is distributed over a greater area in the wagon or other receptacle.

From the foregoing, it will be evident that in my apparatus, the points of the prongs are accelerated as they round the lower end of the elevator which assists them in picking up the material. At the upper end of the elevator, as they are about to reach the top, they first drop backward and then are impelled forward, which actually imparts a fling to the material and distributes it over a greater area in the receiving receptacle. This latter characteristic is especially useful in operating on hay or other loose material, for it throws it to a distance and prevents it from catching on the prongs at the turn and being dragged backward and downward. Considerable difficulty is experienced in collecting and loading loose hay from a field, but my elevator will handle hay effectively and both pick it up readily and also cause it to clear the top of the elevator when it reaches the discharging point.

Having thus described my invention, what I claim as new and desire to secure by Letters Patent, is:—

A belt conveyer having an endless link belt traveling in a vertical plane, sprocket wheels over which the belt passes at the ends of the conveyer, prongs on the belt for engaging the material, said prongs being rotatable relatively to the belt, controlling arms for rotating said prongs relatively to the belt, and a spider concentric with one of said sprocket wheels and rotating therewith, said spider having arms extending beyond the circumference of the wheel for engaging the controlling arms and thereby imparting a temporary forward rotative movement to the prongs, the number of teeth in the sprocket wheel being considerably greater than the number of arms on the spider whereby, by adjusting the link belt forward or backward a tooth or two on the sprocket wheels, the action of the spider arms upon the controlling arms may be varied.

In witness whereof, I have hereunto subscribed my name.

HARRY P. FISHER.